Patented Apr. 17, 1928.

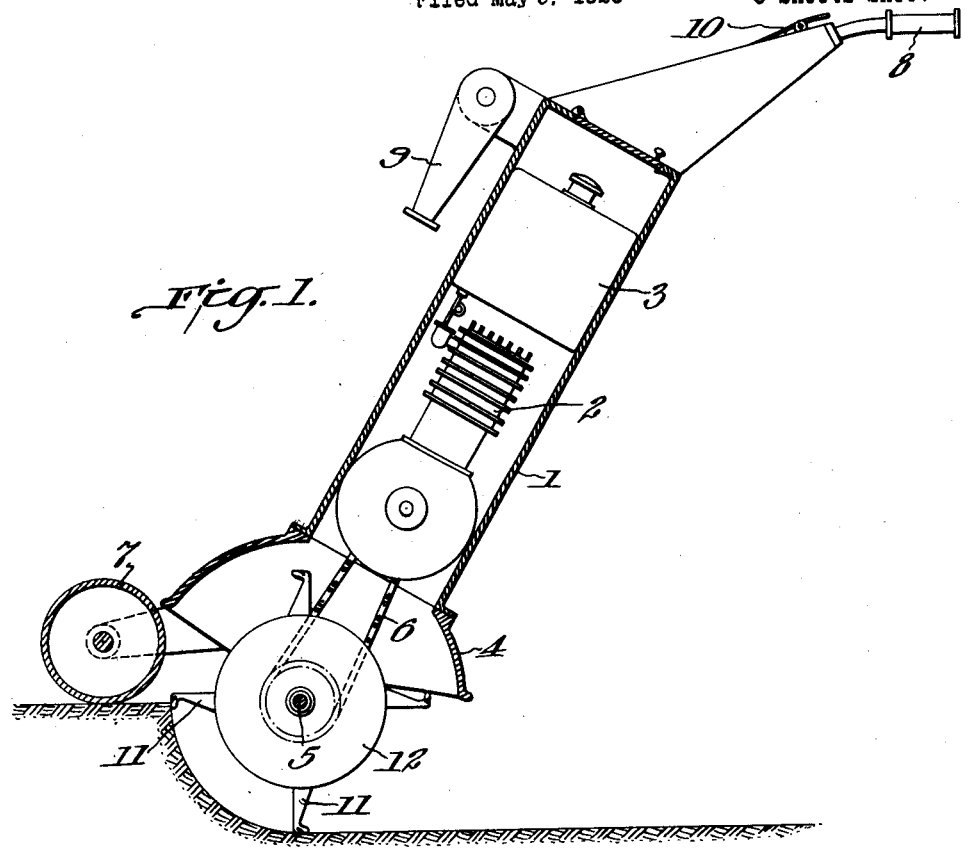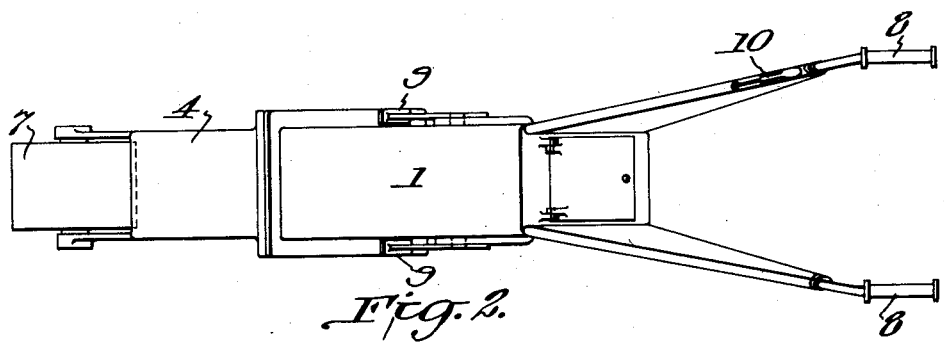

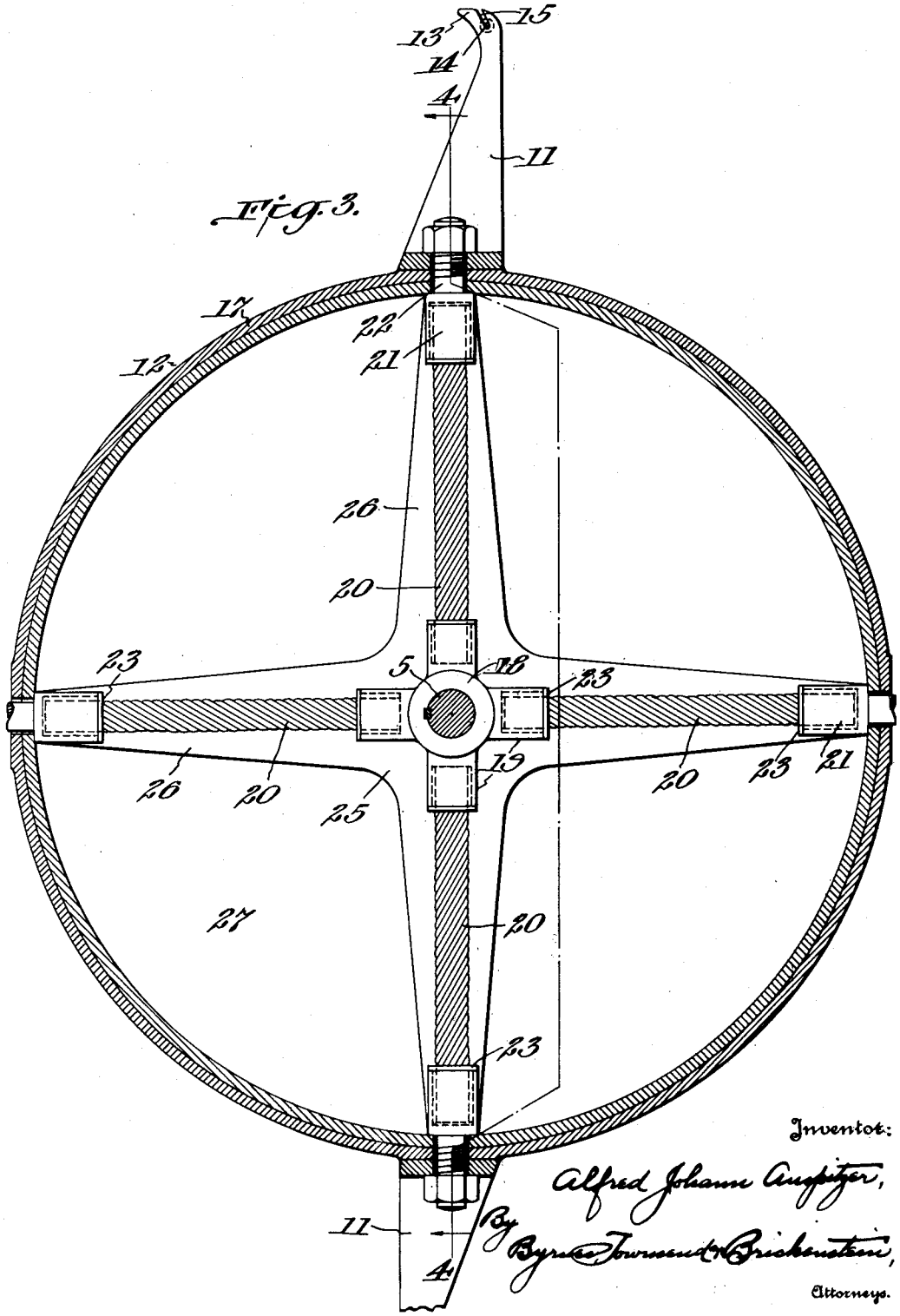

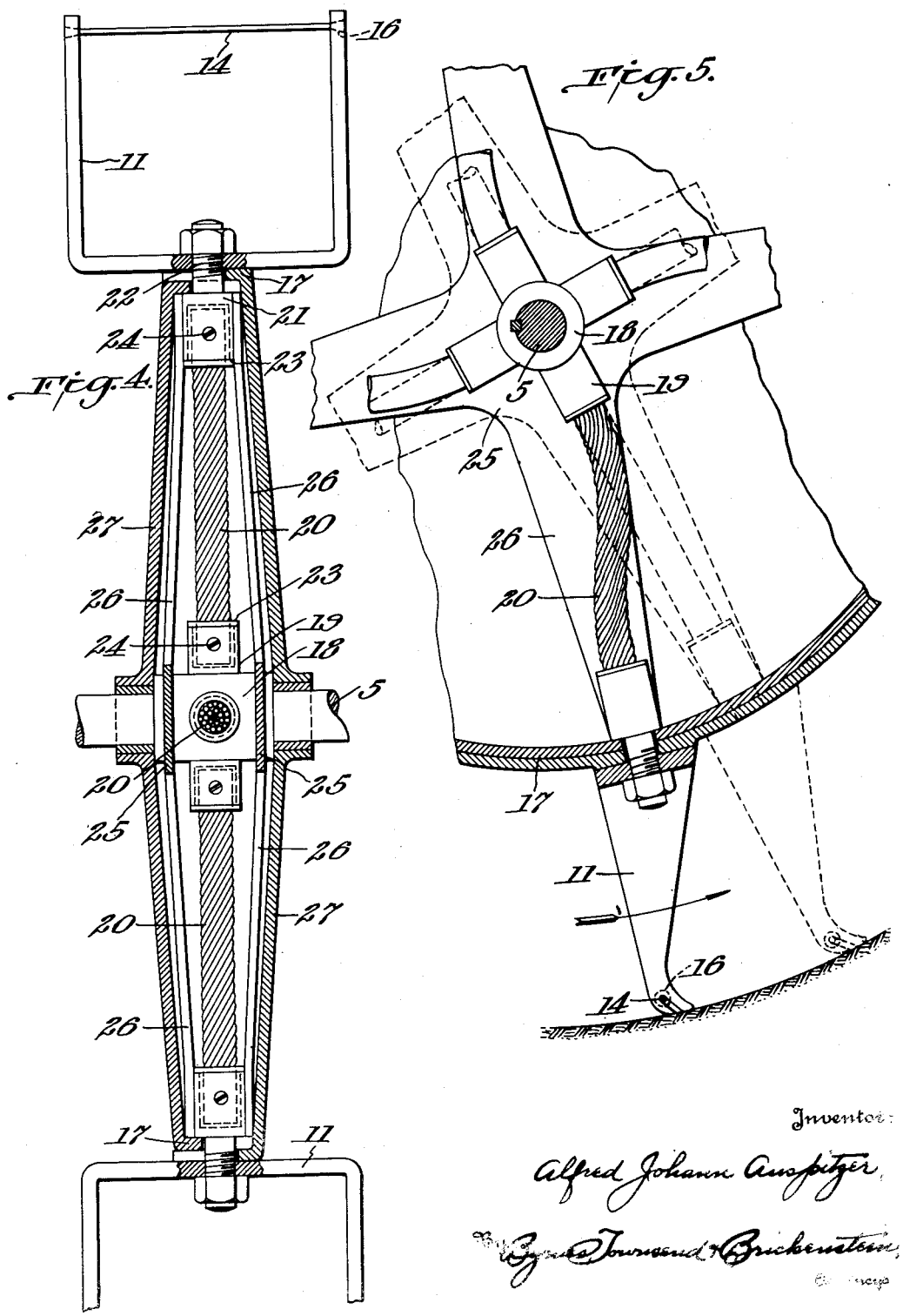

1,666,841

UNITED STATES PATENT OFFICE.

ALFRED JOHANN AUSPITZER, OF HAMBURG, GERMANY, ASSIGNOR TO RESEARCH CORPORATION, OF NEW YORK, N. Y., A CORPORATION OF NEW YORK.

AGRICULTURAL IMPLEMENT.

Application filed May 3, 1926. Serial No. 106,570.

This invention relates to a power-operated agricultural implement and particularly to a device of the rotary plow type.

It is recognized that working the soil by means of implements which disintegrate the soil and stir or turn it present advantages over the more usual type of plow in which the long rows of the soil are bodily turned over with comparatively little or no working of the displaced soil. Known types of rotary plows are open to the serious objections that they are of complicated and expensive construction, and are expensive to operate due to the cost of renewing parts which are broken by encountering roots or rocks. When there are a great many roots in the soil, certain types of machines cannot be used as the roots collect in the machinery and prevent its rotation.

In rotary plows and in other power-operated machinery it is necessary that a resilient drive be employed between the power shaft and parts of the mechanism which may encounter fixed or relatively fixed obstructions.

An object of the invention is to provide a device having an efficient resilient drive which is composed of but few and simple parts. An object is to provide an agricultural implement of the rotary tool type in which the tools are operated through a resilient drive which prevents damage to the tools by roots and stones. A further object is to provide an agricultural implement of such construction that the mechanism is protected from clogging by roots or other material displaced by the operative tools. A further object is to provide a rotary plow tool of high strength and efficiency.

These and other objects of the invention will be apparent from the following specification when taken with the accompanying drawings, in which:

Fig. 1 is an elevation, partly in central section, of one embodiment of the invention;

Fig. 2 is a plan view of the implement;

Fig. 3 is a broken side elevation of the plow member with one of the side disks removed;

Fig. 4 is a vertical section on line 4—4 of Fig. 3; and

Fig. 5 is a detail illustrating the operation of the flexible drive.

In the drawings, the numeral 1 identifies the cylindrical shell or body within which is arranged the motor 2 and fuel tank 3. A flaring dust guard 4 at the lower end of the casing supports a shaft 5 which is driven from the motor shaft by a chain 6 or the like. A ground-engaging wheel 7 is supported from the casing at its lower end and is offset from the side of the casing to permit the positioning of the rotary tool below the ground level when the handles 8 are at a convenient distance above the ground level. A pair of auxiliary supports or legs 9 are pivotally connected to the upper end of the casing 1 for supporting the implement when it is not in use. Suitable switch or other control elements 10 are provided on one of the handles 8.

As shown, the shaft 5 carries a rotary plow having a plurality of tools 11 arranged at the periphery of a supporting wheel 12. Each tool 11 is preferably formed as a U-shaped member, the side bars of which terminate in forwardly directed and pointed ends 13. A cutting member 14 extends between the ends 13 of each tool and preferably takes the form of a hard drawn wire or rod. The ends 13 are preferably slotted as at 15 to receive the enlarged ends 16 of the cutting wire 14. As shown, the slots 15 extend from the outer face of the ends 13 and slope rearwardly in order that the pressure exerted upon the wire 14 will hold it in place.

The several tools 11 are carried by a wheel rim 17 which is operated from the shaft 5 through a flexible drive. A hub 18 is keyed to the shaft 5 and provided with a plurality of sockets 19 within which the ends of cables 20 are secured. The outer ends of the cables 20 are fixed in sockets 21 having threaded extensions 22 which pass through the rim 17. To permit the ready insertion and removal of the cables, the latter are provided with terminal sleeves 23 which are retained in the respective sockets 19, 21 by set screws or the like 24.

In the preferred construction, the threaded extensions 22 serve as means for securing the tools 11 to the rim. Reinforcing frames or spiders 25 are provided at each side of the hub 18 and the outer ends of the arms 26 of the frame are secured to the respective sockets 21 within which the cable ends are fixed. To prevent interference from roots or other material dislodged by the tools the drive mechanism is enclosed by disks or plates 27 which are journaled on and rotatable with respect to the shaft 5. If desired, the disks 27 may be connected to the inner ends of the supporting frames 25. The peripheral edges of the disks 27 extend to the rim 17 and preferably the edges of the disks are turned inwardly and overlapped to constitute the wheel rim.

The resilient drive acts as a shock absorber when the tools strike stones or roots since the cables 20 can flex and elongate as shown in Fig. 5. During the normal operation the cables will be bent as the individual tools strike the ground surface but this deflection of the drive members will not be as great as that which occurs when a comparatively rigid obstacle is encountered. With the drive shaft 5 running at a substantially constant speed the periodic retardation and acceleration of the rim as the tools contact with and move away from the ground increases the effectiveness of the machine. The power stored in the stressed cables is released as one tool moves out of the ground and is available to increase the velocity with which another tool strikes the ground surface.

In operating the device the rotation of the shaft 5 carries the U-shaped tools 11 through the ground to cut and tear the soil apart. The wires 14 cut the portion of the soil which is to be worked from the undisturbed layer. The stresses set up in the wires 14 are not such as to cause deflection in a radial direction and the bottom of the trench which they cut will be substantially parallel to the ground surface. As the undisturbed soil does not present any pockets in which the water may collect, the plant growth will take place under the most favorable conditions.

It will be noted that the construction is simple and comparatively inexpensive and that the parts most subject to wear may be easily replaced. The insertion of the new cutting wire 14 or the replacement of a worn tool requires very little time and but little work.

While I have illustrated the invention as embodied in a rotary plow, it will be apparent that other forms of tools may be carried by the rim 17 and that the resilient drive is capable of use in combination with other elements. It will be understood that the specific construction of the several elements and their relative arrangement is subject to considerable modification without departing from the spirit of my invention as set forth in the following claims.

I claim:

1. In an agricultural implement, a power shaft, an annular tool-carrying rim, and tensioned flexible spokes between said shaft and said rim.

2. In an agricultural implement, a power shaft, an annular rim for carrying ground-engaging tools, and radially arranged cables connected to said rim and power shaft for transmitting power from said shaft to said rim.

3. In a device of the class stated, a resilient drive comprising a power shaft, a hub fixed thereto, a wheel rim, and a plurality of cables between said hub and said rim.

4. A rotary plow comprising in combination, an annular rim, a U-shaped member mounted thereon, and a thin earth-plowing member extending between the ends of the U-shaped member.

5. A rotary plow comprising, in combination, an annular rim, a U-shaped member mounted thereon, said member terminating in forwardly directed ends, and a wire extending between said ends.

6. In a rotary plow, a power shaft, a rim carrying a plurality of earth-plowing tools, and a resilient drive between said shaft and said rim.

7. The invention as claimed in claim 6, wherein said drive comprises a hub fixed to said shaft and a plurality of cables between said hub and said rim.

8. In a rotary plow, a power shaft, a hub fixed to said shaft, a wheel rim carrying tools, a resilient drive between said hub and said rim, and a disk at each side of said hub for enclosing said drive mechanism, said disks being rotatable on said shaft.

9. The invention as claimed in claim 8 wherein the peripheral edges of said disks are inturned to form the rim.

10. In a rotary plow, an implement including an annular rim, and an earth cutting tool mounted thereon, said tool comprising a U-shaped element, and a wire connecting the legs of said element adjacent their ends, the legs of the U-shaped element being slotted to receive said wire, said slots being cut at an angle.

11. A rotary plow comprising a power shaft, an annular rim, a plurality of U-shaped tools mounted on said rim, and driving means between said power shaft and said rim comprising a plurality of flexible spokes.

12. The structure as in claim 11 wherein the U-shaped tools carry a thin member between their ends.

In testimony whereof, I affix my signature.

ALFRED JOHANN AUSPITZER.